US011716671B2

(12) United States Patent
Dhawan et al.

(10) Patent No.: US 11,716,671 B2
(45) Date of Patent: *Aug. 1, 2023

(54) SYSTEMS AND METHODS FOR OPTIMAL CHANNEL SELECTION

(71) Applicant: INCONTACT INC., Sandy, UT (US)

(72) Inventors: Salil Dhawan, Pune (IN); Ashish Seth, Los Altos, CA (US); Sebastien Roland Mancel, Danville, CA (US); Tushar Deshmukh, Pune (IN); Deepak Tiwari, Daund (IN); Saiprasad Vyawahare, Akhada Balapur (IN); Omkar Shrihari Joglekar, Pune (IN); Mukesh Kumar Agarwal, Pune (IN); Rahul Vyas, Jodhpur (IN)

(73) Assignee: INCONTACT INC, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,447

(22) Filed: Dec. 13, 2022

(65) Prior Publication Data

US 2023/0112197 A1    Apr. 13, 2023

Related U.S. Application Data

(63) Continuation of application No. 17/730,361, filed on Apr. 27, 2022, now Pat. No. 11,546,826, which is a (Continued)

(51) Int. Cl.
*H04W 4/00* (2018.01)
*H04W 40/12* (2009.01)
*H04L 43/0829* (2022.01)
*H04L 43/0864* (2022.01)
*H04L 43/087* (2022.01)

(52) U.S. Cl.
CPC .......... *H04W 40/12* (2013.01); *H04L 43/087* (2013.01); *H04L 43/0841* (2013.01); *H04L 43/0864* (2013.01)

(58) Field of Classification Search
CPC ........ H04W 40/12; H04L 43/08; H04L 43/10; H04L 43/16
See application file for complete search history.

(56) References Cited

U.S. PATENT DOCUMENTS 9,319,290 B1    4/2016 Lewis et al.
10,148,539 B2 * 12/2018 Ruffini ................. H04J 3/0682
(Continued)

OTHER PUBLICATIONS

U.S. Appl. No. 11/337,133, Dhawan, et al. filed Apr. 27, 2022.

*Primary Examiner* — Abdelnabi O Musa
(74) *Attorney, Agent, or Firm* — Haynes and Boone, LLP

(57) ABSTRACT

Embodiments described herein provide an optimal communication channel recommendation engine by assessing whether the environment the customer is situated in is conducive to the channel selected by the customer. Specifically, the optimal channel recommendation engine obtains data artifacts indicative of ambient noise, motion, customer sentiment, network quality, customer focus, and/or the like to assess quality of the environment and recommend an optimal channel for the communication between the customer and the call agent. With the recommendation to switch to a different channel, the client component resumes communication with the new channel and retains the context of the interaction.

20 Claims, 8 Drawing Sheets

Related U.S. Application Data continuation of application No. 17/170,298, filed on Feb. 8, 2021, now Pat. No. 11,337,133.

(56) References Cited

U.S. PATENT DOCUMENTS

| | | | |
|---|---|---|---|
| 10,299,221 B1* | 5/2019 | Marupaduga | H04B 7/15528 |
| 11,337,133 B1 | 5/2022 | Dhawan et al. | |
| 2005/0182672 A1 | 8/2005 | Hemm et al. | |
| 2014/0219230 A1 | 8/2014 | Schierl et al. | |
| 2016/0065435 A1* | 3/2016 | Ito | H04L 43/0864 |
| | | | 375/358 |
| 2016/0173352 A1* | 6/2016 | Danielsson | H04J 3/0676 |
| | | | 370/252 |
| 2016/0371703 A1* | 12/2016 | Monegan | H04L 67/148 |
| 2018/0167299 A1* | 6/2018 | Karlsson | H04J 3/0682 |
| 2019/0181981 A1 | 6/2019 | Hwang et al. | |
| 2019/0261071 A1* | 8/2019 | Rafique | H04B 10/0793 |
| 2019/0384965 A1 | 12/2019 | Rodriguez et al. | |
| 2020/0191979 A1* | 6/2020 | Lindskog | G01S 5/0221 |
| 2020/0367130 A1 | 11/2020 | Nammi et al. | |
| 2020/0412425 A1* | 12/2020 | Laghate | H04B 7/0617 |
| 2021/0076223 A1 | 3/2021 | Taneja et al. | |

* cited by examiner

SYSTEMS AND METHODS FOR OPTIMAL CHANNEL SELECTION

CROSS REFERENCE TO RELATED APPLICATIONS

This patent application is a continuation application of U.S. patent application Ser. No. 17/730,361, filed Apr. 27, 2022, now allowed, which is a continuation application of U.S. application Ser. No. 17/170,298, filed Feb. 8, 2021, now U.S. Pat. No. 11,337,133, the entire contents of each which is hereby incorporated herein by express reference thereto.

TECHNICAL FIELD

The present disclosure relates generally to communication networks for audio calls, and more specifically to a system and method for optimal channel selection between a caller and a call agent.

BACKGROUND

Customers usually have a variety of ways to connect with organizations, such as voice, email, chat, text or social media. For example, a customer may initiate an audio call, an online chat session, a video call, and/or other real-time interactive communication session with a customer service agent for a bi-directional dialog to follow up questions. However, when call center agents (as well as customers) work from home or on the go, as often permitted in the modern workplace, the quality of a communication such as an audio call to a contact center can be seriously impacted. For example, the agent or the customer may be calling from an environment with significant background noise, with limited network conductivity, and/or the like. Thus, due to impaired communication and disruption, customer and agent usually need to repeat portions of the conversation, which is frustrating and time consuming. Similar problems may also arise in video calls or voice conferences—thus leading to unsatisfactory quality of service affecting business metrics like Customer Satisfaction and Average Handle time for interactions.

Accordingly, a need exists for methods and systems for improving the quality of communication between customers and call agents.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
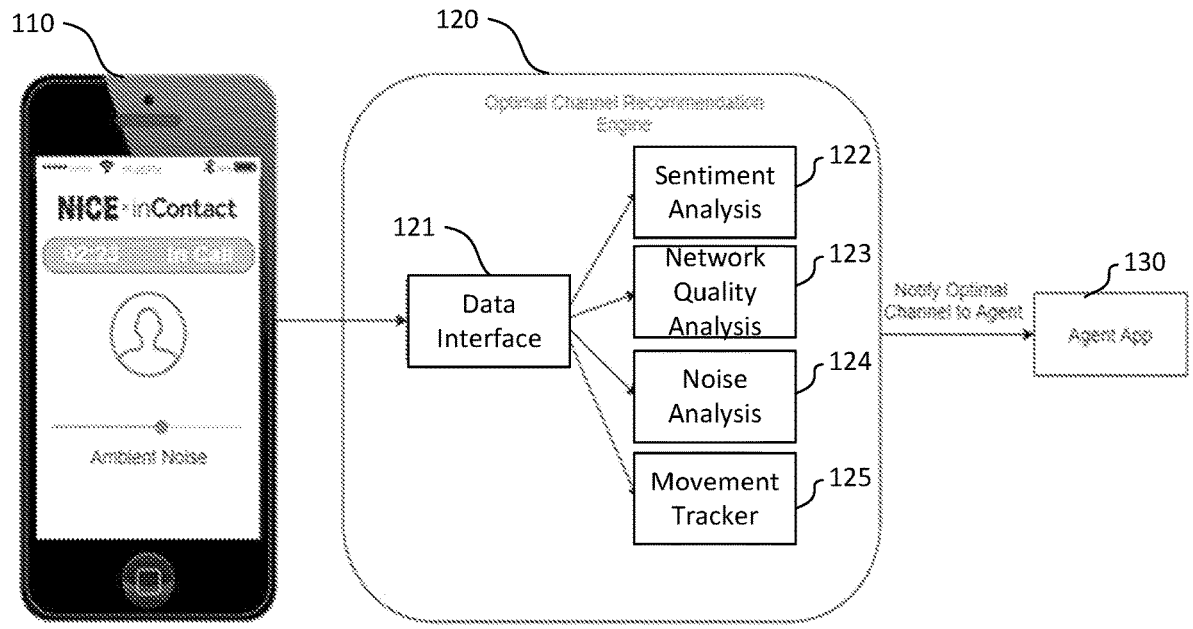
FIG. 1 is a simplified block diagram illustrating an overview of a client component collecting artifacts for the optimal channel recommendation engine to provide a channel recommendation, according to embodiments described herein.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In view of the need to improve quality of communication between customers and call agents from adverse environments, various embodiments described herein provide an optimal communication channel recommendation engine by assessing whether the environment the customer is situated in is conducive to the channel selected by the customer. Specifically, the optimal channel recommendation engine contains a client component, which may be deployed at a customer device to collect data artifacts indicative of ambient noise, motion, customer sentiment, network quality, customer focus, and/or the like. These data artifacts may be sent to a server that analyzes the artifacts to assess quality of the environment and recommend an optimal channel for the communication between the customer and the call agent. With the recommendation to switch to a different channel, the client component resumes communication with the new channel and retains the context of the interaction. The server may assign the customer to the same agent to provide a seamless transition across different communication channels.

For example, depending on network quality analysis, the optimal channel recommendation engine may determine whether customer interaction may be carried via video, voice, or chat channels, e.g., when data artifacts indicate that the connection between the customer and the call agent is less responsive, a non-real-time channel such as a chat channel may be recommended, and/or the like. The channel recommendation and/or channel switching may occur constantly, intermittently, or periodically, e.g., before the customer initiates a communication request or in real-time during a communication session between the customer and the call agent.

As used herein, the term "patron," "client," or "user" may be used interchangeably to refer to an individual, or an entity that operates a computing device to conduct a communication session with a call center housed with a remote server.

As used herein, the term "agent" may be used to refer to an individual, or an intelligent entity (such as an artificial intelligence-based chatbot) that operates within the call center to respond to a communication request and in turn conduct a communication session with a user.

FIG. 1 is a simplified block diagram illustrating an overview of a client component collecting artifacts for the optimal channel recommendation engine to provide a channel recommendation, according to embodiments described herein. A client device 110, such as a Smartphone, a tablet computer, a laptop computer, a desktop computer, a wearable device, and/or any other personal computing device that is configured to initiate a communication request, may collect metrics about the communication channel, such as recording ambient noise of the surrounding, detecting channel response time, channel available bandwidth, global positioning system (GPS) coordinates, and/or the like, and send such collected artifacts to the optimal channel recommendation engine 120.

The optimal channel recommendation engine 120 may be housed at a remote server, and receive metrics from the client component 110, e.g., at data interface 121. The metrics may include any combination of a network quality indicator, a user sentiment indicator, an environment noise indicator, a location indicator, or a motion indicator.

For example, a sentiment analysis module 122 at the recommendation engine 120 may extract one or more keywords relating to user sentiment from the microphone reading clip and determine a user sentiment score indicating a communication quality of a live conversation based on the keywords. For instance, certain key words such as "can you hear me," or repeated "hello," "are you there" may be associated with a dissatisfactory sentiment score. When these words are detected from the recorded audio conversation, a low level of user satisfaction may be determined.

For another example, the network quality analysis module 123 may analyze the network quality indicator, which includes any combination of a signal strength, a jitter, a packet loss, a latency and a ping signal of the user-selected communication channel. For instance, the frequency of ping signal receipt may indicate the connectivity level and stability of the user-selected communication channel currently in use. Further exemplary details of the ping signal process are described in relation to FIG. 8.

For another example, an ambient noise detection module 124 may analyze the environment noise indicator to determine a level of recorded ambient noise of the environment that the client device 110 is situated in. For instance, if a high noise level is detected, the user is less likely to have a quality audio call.

For another example, a movement tracking module 125 may analyze the motion indicator which may include a movement velocity, direction and/or acceleration parameter of the client device 110, indicating a movement pattern of the user who is engaging in the current communication session. For instance, if a movement pattern of high velocity in a stable direction is detected, the user is likely to be traveling in a vehicle, e.g., driving, and less likely to engage in a text chat session. Or if the movement pattern indicates frequent and repeated vertical movements, the user is likely to be engaging in physical activity and may not be able to conduct a chat or audio communication session at that time with that equipment.

Additional metrics such as the location indicator may include GPS coordinates of the client device 110 indicating an address where the client device 110 is located. For instance, if the user is determined to be located in a rural area with limited Internet coverage, a video (digital) communication channel may not be available.

In one embodiment, modules 122-125 may be operated simultaneously or alternately, depending on data that is available for analysis. In one embodiment, when several data metrics are available, e.g., the sentiment indicator, the movement indicator, and the location indicator, the optimal channel recommendation engine may make a channel recommendation based on aggregated analysis. For example, the recommendation engine may compute a channel quality metric based on a weighted sum of the metrics, a set of pre-defined rules that prioritize certain data metrics, and/or the like.

The optimal channel recommendation engine 120 may then determine a recommended channel based on the analysis from module 122-125 and send the recommended channel to the agent application 130. Data metrics may be monitored for entire duration of the call such that data metrics may be progressively collected and/or supplemented as more data becomes available. The recommendation engine may weigh each factor and their impact on the channel selection. In addition, the recommendation engine 120 may message the agent or the customer to surface problems and offer corrective actions to address underlying connection issues.

When the optimal channel recommendation engine 120 recommends a channel that is different from the channel that is currently in use, e.g., a voice channel is recommended instead of the current video channel when network bandwidth is limited, the communication channel may switch from the current one to the recommended channel. In this case, the optimal channel recommendation engine 120 may resume the connection between the client device 110 and the call agent on the newly switched channel.

Figure 2:
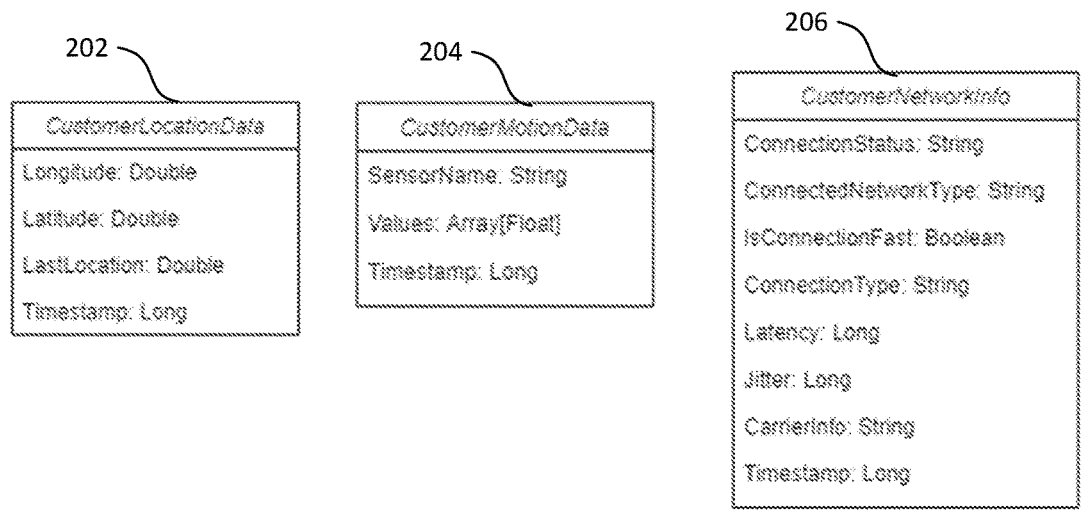
FIG. 2 provides example data structures of data metrics collected by the client device and sent to the optimal channel recommendation engine in FIG. 1, according to embodiments described herein.

FIG. 2 provides example data structures of data metrics collected by the client device 110 and sent to the optimal channel recommendation engine 120 in FIG. 1, according to embodiments described herein. Block 202 shows an example data segment of the customer location data including data fields "longitude," "latitude," "last location," and "time stamp." Block 204 shows an example data segment of the customer motion data, which includes data fields such as "sensor name," "value" of the sensor, "time stamp," and/or the like. Block 206 shows an example data segment of the customer network information, which includes data fields such as "connection status," "connected network type," "is connection fast," "connection type," "latency," "Jitter," "carrier information," "time stamp," and/or the like.

Figure 3:
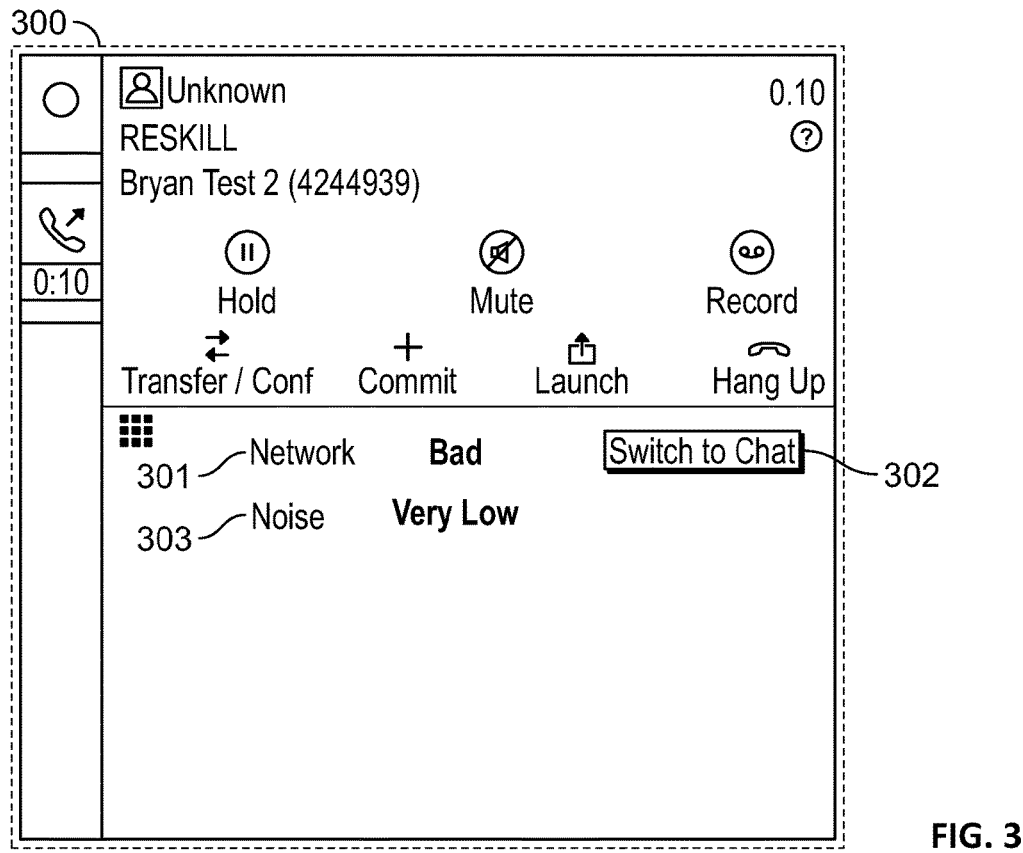
FIG. 3 provides an example user interface diagram for the agent application shown in FIG. 1, according to some embodiments described herein.

FIG. 3 provides an example user interface diagram 300 for the agent application 130 shown in FIG. 1, according to some embodiments described herein. The agent application user interface may provide an indicator of network quality 301, an ambient noise indicator 303 and a channel recommendation 302 to the call agent. In the example shown at 301-303, when the network quality is poor as indicated at 301 but the ambient noise at the client side is low as indicated at 302, the call agent may be recommended to switch to a chat session, instead of an ongoing audio call. When the call agent chooses to switch to a non-voice or non-video channel such as a chat session, the call agent may initiate the session and guide the customer to the session to ensure the customer is comfortable with the change and to ensure continuity of the interaction.

For another example, when the network quality is poor, ambient noise is high, continuous movement of the customer or agent is causing heavy packet loss or high jitter, the call center agent may be notified so that he or she can decide to switch to a digital channel such as between a video call to traditional telephony or a digital voice call such as VoIP.

Figure 4:
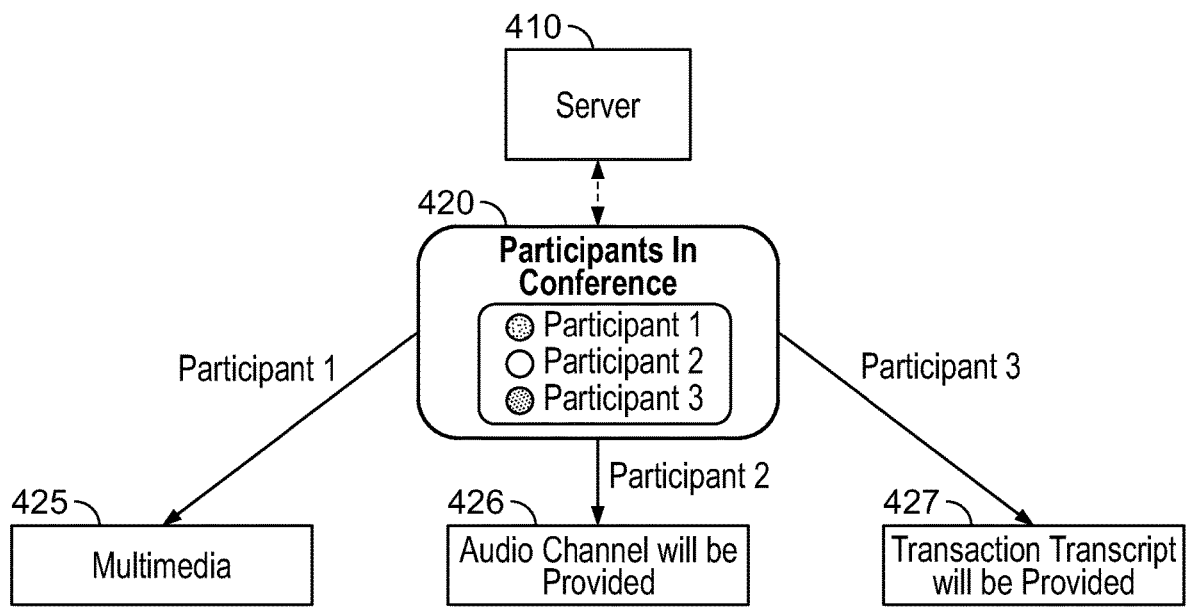
FIG. 4 provides an example system diagram illustrating a use case of channel recommendation in a multi-party conference call, according to embodiments described herein.

FIG. 4 provides an example system diagram illustrating a use case of channel recommendation in a multi-party conference call, according to embodiments described herein. A server 410 may be the remote server that house the optimal channel recommendation engine 120 in FIG. 1. The server 410 may host a multi-party conference call 420 that includes three participants (or any number of participants). The server 410 may collect data metrics from different participants and recommend a different communication channel to each respective participant based on similar analysis performed by the optimal communication channel recommendation engine 110 in FIG. 1.

For example, when participant 1 has better network, participant 1 is suggested to use a multimedia channel 425 with both audio and video mode to connect to the conference bridge 420. Participant 2 has fair but not poor network quality, so participant 2 may be suggested to avoid video but to connect with an audio channel 426. Participant 3 may be struggling with the network bandwidth, so participant 3 may be recommended to use the transcript option such that a live transcription 427 may be delivered for participant 3 to read the ongoing conversation between other participants.

In this way, on the same conference bridge 420, participants 1-3 may stay connected via different communication channels based on their respective network quality. Each participant may be able to see other participants status and mode of communication via a user interface on their respective device.

Figure 5:
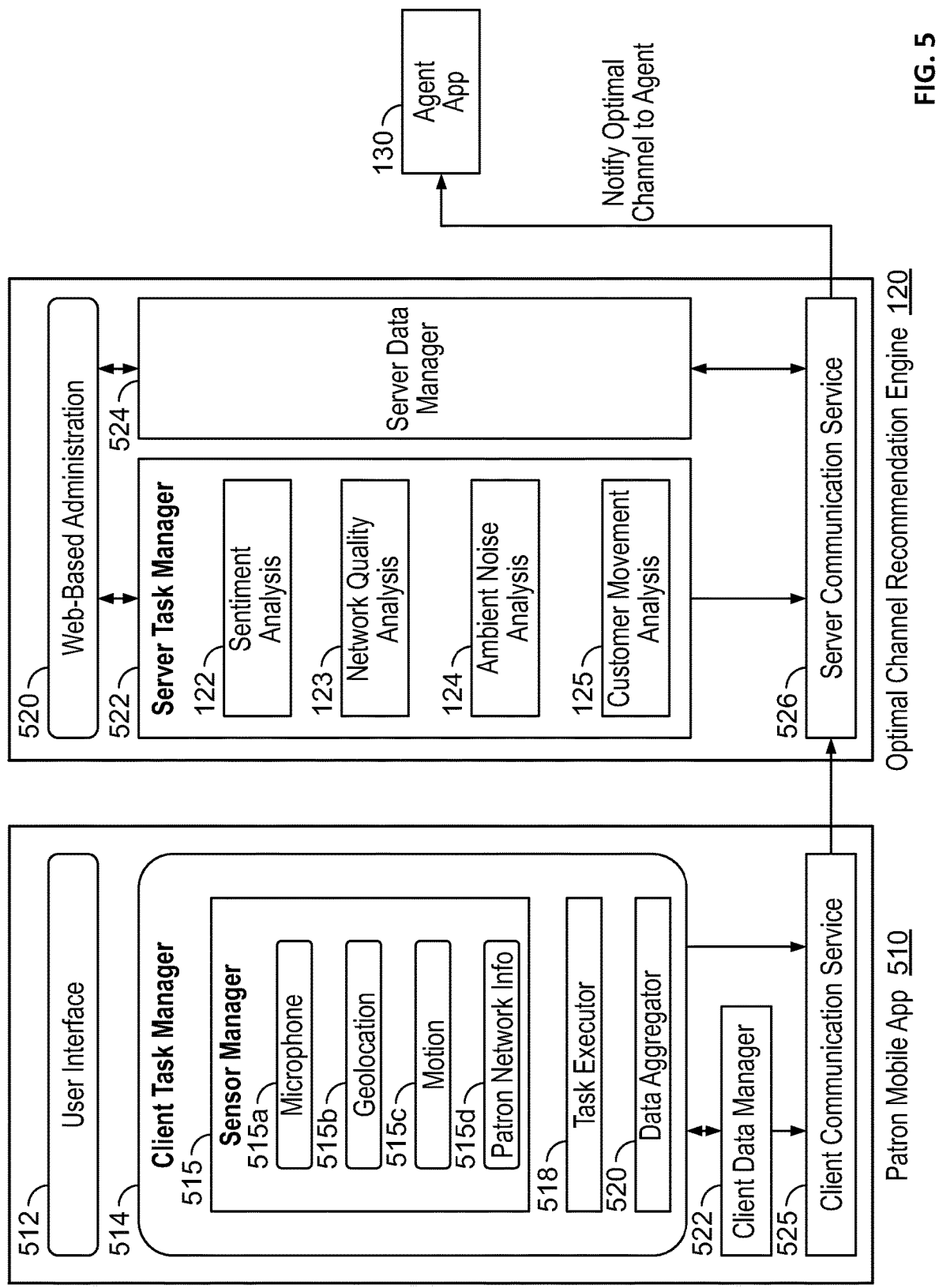
FIG. 5 provides an example architecture diagram illustrating detailed components of the client device and server-side recommendation engine shown in FIG. 1, according to embodiments described herein.

FIG. 5 provides an example architecture diagram illustrating detailed components of the client device 110 and server-side recommendation engine 120 shown in FIG. 1, according to embodiments described herein. A client component such as in the form of a patron mobile application 510 may be installed on the client device 110 shown in FIG. 1. The patron mobile application 510 may include a user interface 512 configured to interact with a user (customer) and to receive user permissions required by the application such as location access, storage access and audio.

The patron mobile application 510 further includes a client task manager 514 that interacts with other hardware or software components of the client device 110. A sensor manager 515 may implement the access to the different sensors equipped with the client device 110, such as microphone 515a which is configured to record the ambient noise, a geolocation component 515b which is configured to obtain the GPS coordinates and the orientation of the client device, a motion sensor 515c which is configured to detect the movement pattern of the client device, a network component 515d that is configured to obtain patron network information, and/or the like. The patron mobile application 510 further includes task executor 518 configured to interact with a data manager 522 to fetch the tasks to be performed based on the media type. A data aggregator 520 is configured to create data artifacts by combining all the readings from different sensors for sending to the server.

The patron mobile application 510 further includes a client data manager 522 that stores the tasks to be performed based on contact type. The readings from all the sensors 515a-d are stored in the client data manager 522 until data artifacts has been prepared by aggregating the previously stored sensor measurements. The client communication service 525 communicates with the client task manager 514 to obtain the prepared data artifact and send the data artifact to the optimal channel recommendation engine 120 at the remote server.

At the server side, the optimal channel recommendation engine 120 includes a server communication service 526 that receives the data artifact sent by the client communication service 525. The received data artifact is passed to a server task manager 522 for analysis of the data received from client. For example, modules 122-125 may be similar to those described in relation to FIG. 1, which performs sentiment analysis, network quality analysis, ambient noise analysis and agent movement analysis on the received data. Results of the analysis are stored in the server data manager 524 and may be displayed on a user interface for the system administrator. The results of analysis may further be used to generate a channel recommendation, which is sent by the server communication service 526 to an agent application 130.

The optimal channel recommendation engine 120 further includes a web-based administration component 520, which provides an interface for an administrator to configure and/or select which metrics or analysis to be collected and performed.

Figure 6:
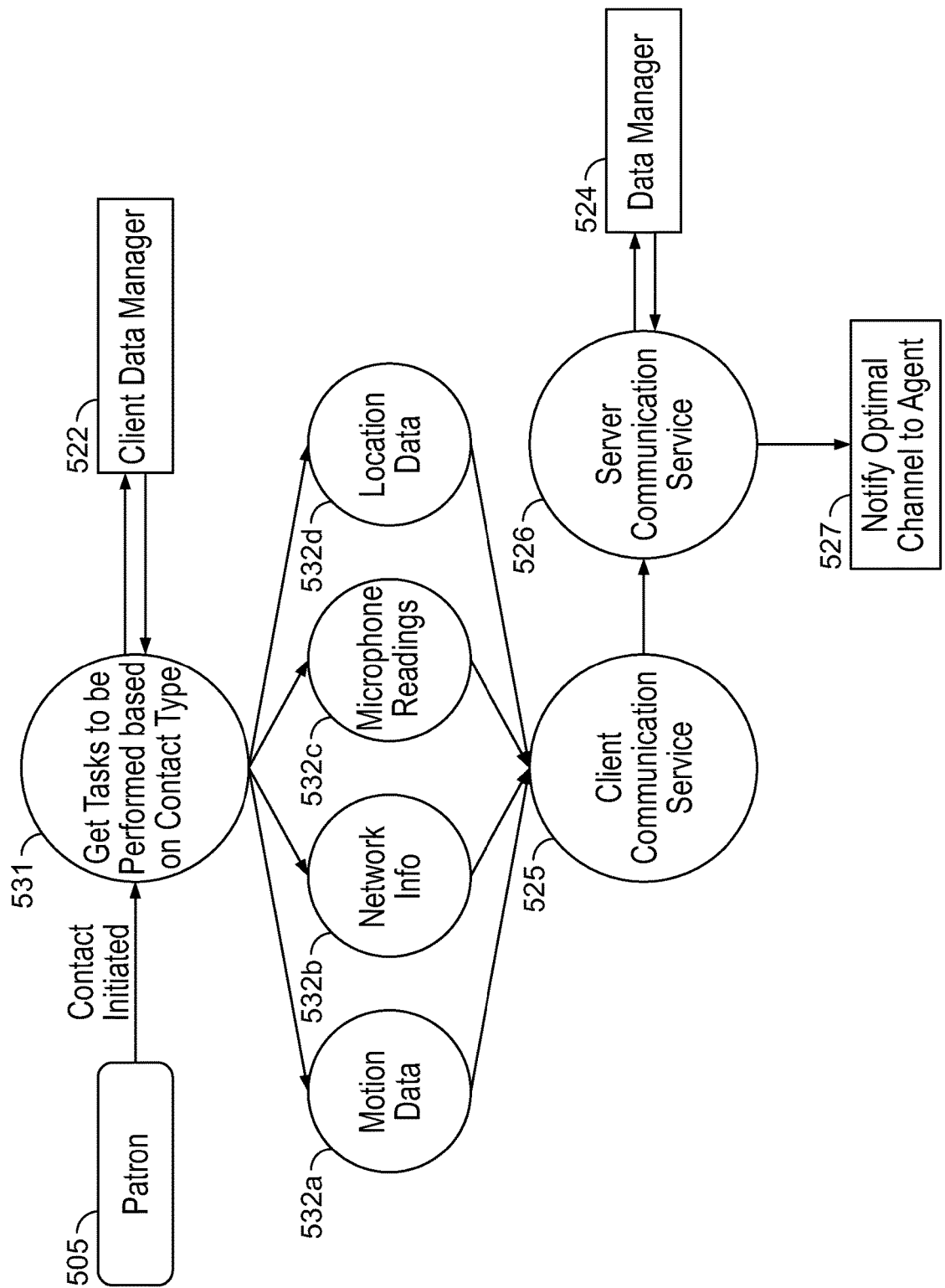
FIG. 6 provides an example flow diagram illustrating the interaction between the patron application and server-side components in the architecture shown in FIG. 5, according to embodiments described herein.

FIG. 6 provides an example flow diagram illustrating the interaction between the patron application 510 and server-side components in the architecture shown in FIG. 5, according to embodiments described herein. For example, as shown in FIG. 6, a patron 110, e.g., a user who is operating a client device, may initiate contact by starting a call with a call agent. The contact initiation may trigger the process 531 of getting tasks to be performed based on the contact type (e.g., whether a call agent has been called). The client data manager 522 of the patron application may in turn issue the relevant tasks to be performed to collect client-side data metrics.

For example, motion data 532a, network information 532b, microphone readings 532c, location data 532d, and/or the like, may be obtained by the initiated tasks at the client side. The collected data may be aggregated and transmitted by the client communication service 525 to the server communication service 526 at the server side. Similar as described in relation to FIG. 5, the server communication service 526 may provide the data metrics to the data manager 524 and receive a recommended channel from the data manger 524. The server communication service may then start the operation 527 of notifying an optimal channel to the agent.

Figure 7:
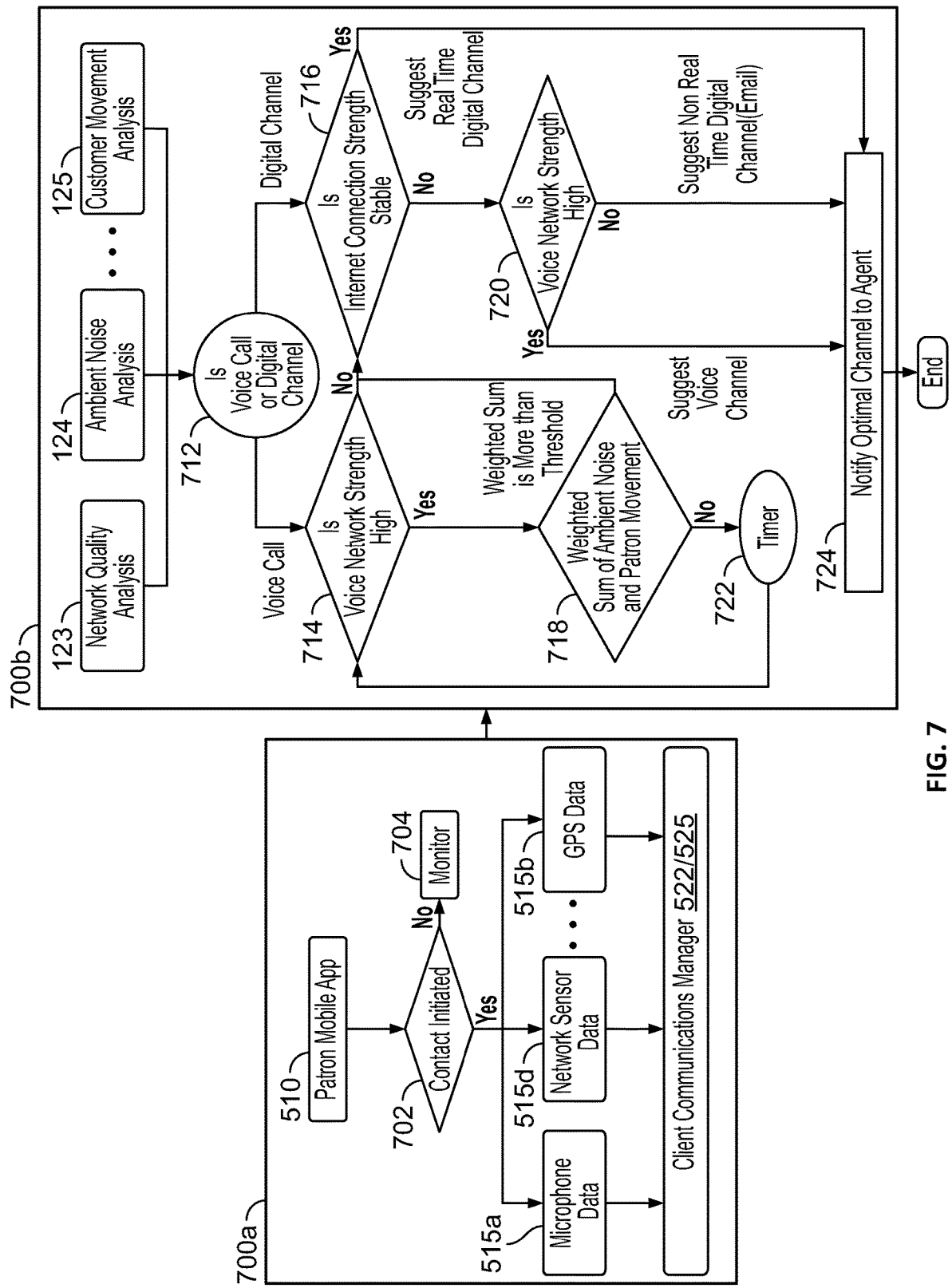
FIG. 7 provides another example flow diagram illustrating the client side and the server-side work flows, according to embodiments described herein.

FIG. 7 provides another example flow diagram illustrating the client side and the server-side work flows, according to embodiments described herein. The client-side work flow 700a is similar to that described in relation to FIG. 6. A patron mobile application 510 may monitor the call status of the client device, e.g., whether a contact is initiated at 702. The patron mobile application 510 may continue monitoring at 704 if no contact is initiated. When a contact is initiated at 702, the patron mobile application 510 may collect a variety of data metric collection tasks, such as but not limited to microphone data 515a, network sensor data 515d, GPS data 515b, and/or the like (more data metrics are described in relation to FIGS. 5-6). These data metrics may be aggregated at the client communication manager (similar to 522 or 525 in FIG. 5) and sent to the server side.

The server-side work flow 700b shows a specific example of recommending the voice or digital channel. Specifically, work flow 700b may start with the network quality analysis module 123, ambient noise analysis module 124, customer movement analysis module 125, and/or the like, which analyze the received data metrics. The server, e.g., the optimal channel recommendation module, may determine whether a voice or a digital channel is being initiated, or currently in use by the client device, at step 712.

If the voice channel is being used, the server may determine whether the voice network strength (e.g., signal strength, response time, etc.) is higher than a threshold at step 714. When the voice network strength is high, the server further determines whether a weighted sum of ambient noise level and patron movement level is greater than a threshold at step 718. For example, the patron movement level may be indicated by a velocity or acceleration parameter of the movement. For another example, the patron movement level may be indicated by a movement pattern, e.g., abrupt change of motion may be associated with a higher movement level, while a steady motion may be associated with a lower movement level. When the weighted sum is no greater than the pre-defined threshold, indicating the patron is in a quiet environment with limited physical activity, which is suitable for a voice call, the server may continue to allow the voice call in procession. Meanwhile, the server may run a timer 722 such that the server may periodically, intermittently or constantly monitor whether the voice channel network strength is sufficient, e.g., back to step 714.

On the other hand, when the weighted sum of ambient noise level and patron movement level is greater than the threshold at step 718, indicating the patron is likely in a noisy environment or engaging in heightened physical activities, which is not a suitable situation for a voice call, the server may attempt to resort to a digital channel, e.g., to step 716.

Thus, when a digital channel is being used or being resorted to from step 718, the server may determine whether the internet connection strength is stable at step 716. For example, Internet connection strength may be examined based on packet loss, bandwidth, latency, and/or the like. When the Internet connection strength is stable, the server may suggest a real-time digital channel (e.g., a video and audio call) and notify the recommended channel to the agent at step 724. When the Internet connection strength is unstable, the server may in turn examine whether the voice network strength is high at step 720—if the voice network is strong, the server may suggest a real-time voice channel (e.g., a voice call) at step 724; otherwise, if the voice network is not strong either, the server may suggest a non-real-time digital channel (e.g., instant message, email, etc.) at step 724.

Figure 8:
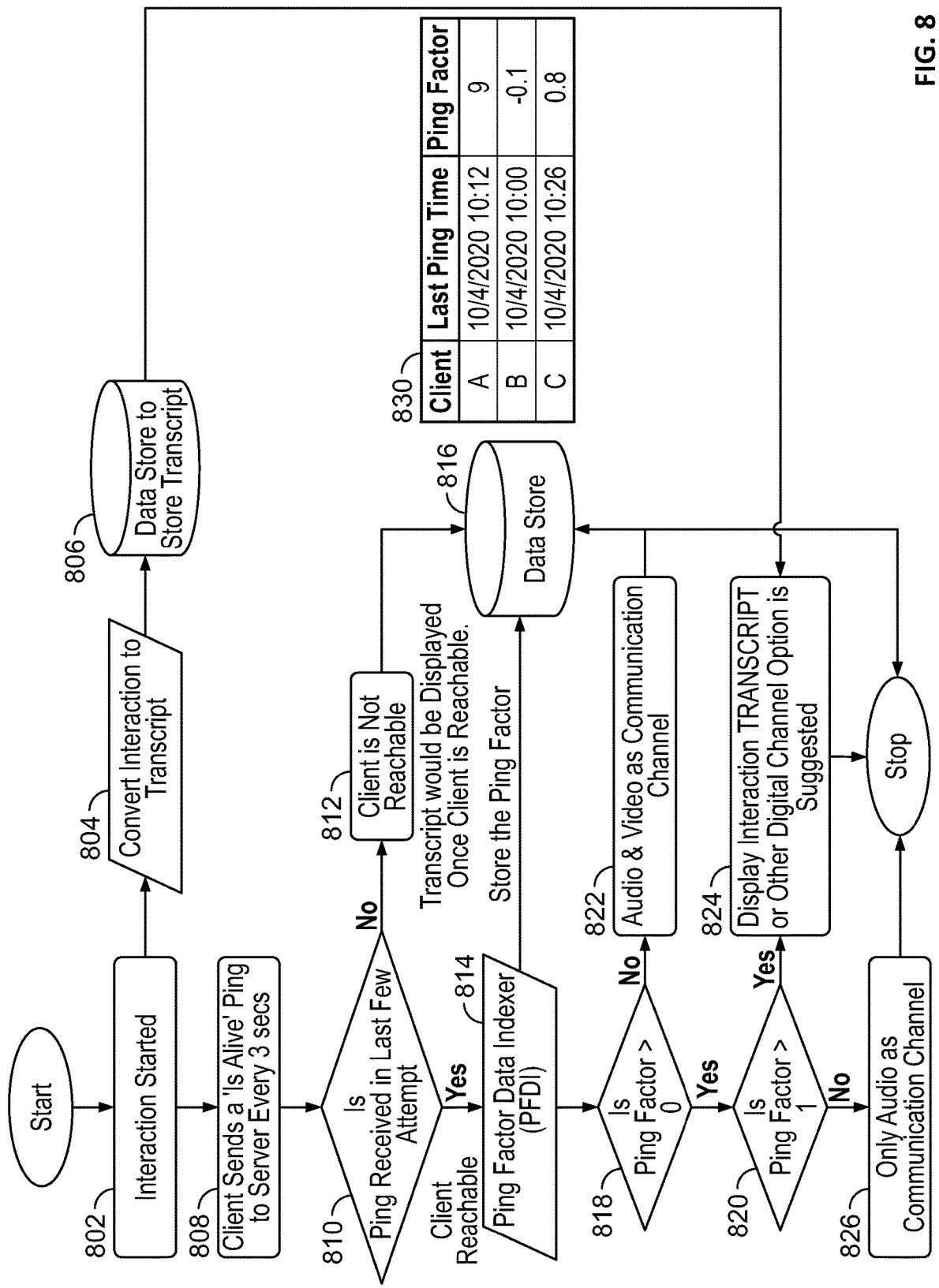
FIG. 8 provides a logic flow diagram illustrating an example process of ping factor indexing from the client side for the optimal channel recommendation engine to make a channel recommendation, according to embodiments described herein.

FIG. 8 provides a logic flow diagram illustrating an example process of ping factor indexing from the client side for the optimal channel recommendation engine to make a channel recommendation, according to embodiments described herein. For example, the client device 110 shown in FIG. 1 may keep pinging the server every 2-3 seconds to notify that the connection is "alive." The server may keep these ping related data in a data store and may calculate a ping factor data index that is used in deciding which channel to recommend.

Specifically, starting at step 802, once the client device initiates interaction with the call agent, e.g., by initiating a call or contact attempt in a different form, the server may convert the interaction to transcript at step 804, and save the transcript at a data store 806.

At step 808, the client device may send a ping signal, e.g., indicating the client device and its connection to the server is "alive," to the server periodically (e.g., every 2-3 seconds, etc.). At step 810, the server may determine whether the ping signal is received in the last few attempts, e.g., within a period of time. If no ping signal is received within a threshold amount of time, the server may determine that the client device is not reachable. If the ping signal is received within the threshold amount of time, the server computes a ping factor data indexer (PFDI) at step 814, based on the last received time stamp of the ping signal. The data store 816 may further record timestamps when a supposed ping signal fails to arrive at the server.

For example, the PFDI may be calculated based on the time taken for a client to send a ping signal to the server, referred to as $T_{actualping}$, and the ideal time a client is supposed to take to send a ping to the server, referred to as $T_{referenceping}$:

$$PFDI = (T_{actualping} - T_{referenceping})/T_{referenceping}.$$

The PDFI may then be stored at the data store 816. Thus, the data store 816 stores the last ping time and the calculated ping factors of different client devices, e.g., as shown at table 830. The lower the PDFI, the better the network quality is. If the PDFI is <0, the network quality is usually decent and hence, a real-time (voice/audio or video) channel may be chosen. If 0<PDFI<1, the network quality is typically decent enough only to persist with an audio call. If PDFI>1, the network quality is too poor to support any real-time communication channel.

Therefore, at step 818, when the PFDI is no greater than 0, then both Audio and Video channel is recommended at step 822. Otherwise, when the PFDI is greater than 0 at 818 and also greater than 1 at step 820, the interaction transcript will be retrieved from the data store 806 and displayed, and/or other digital channel option such as instant message, email, social media, text message, and/or the like, may be recommended at step 824. Otherwise, when the PFDI is greater than 0 at step 818 but no greater than 1 at step 820, an audio-only channel may be recommended as the communication channel at step 826.

For example, Table 1 shows a few examples of the calculation of PFDI which indicates the network quality and recommended follow-up actions corresponding to a relevant communication channel.

TABLE 1

Example PFDIs

| $T_{actualping}$ | $T_{referenceping}$ | PFDI | Action |
|---|---|---|---|
| 200 ms | 20 ms | 9 | Network is very poor hence transcript will be provided |
| 18 ms | 20 ms | −0.1 | Audio and video will be recommended as the network is solid |
| 36 ms | 20 ms | 0.8 | Audio channel will be recommended |

Figure 9:
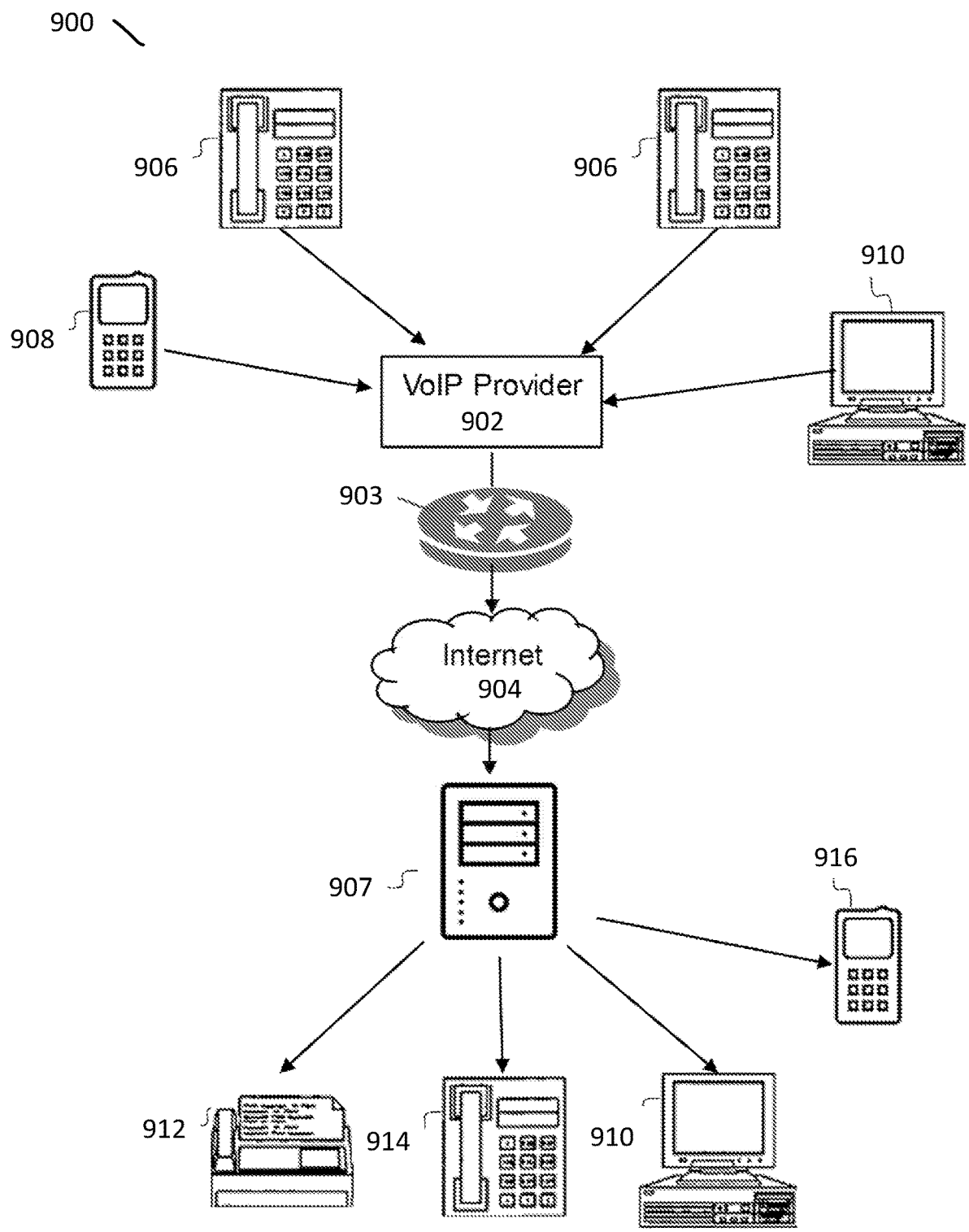
FIG. 9 is a simplified block diagram of an embodiment of a communication network 900, on which some embodiments described in FIGS. 1-8 may be implemented, according to various aspects of the present disclosure.

FIG. 9 is a simplified block diagram of an embodiment of a communication network 900, on which some embodiments described in FIGS. 1-8 may be implemented, according to various aspects of the present disclosure. A "communication network" as used herein can include any facility or system server suitable for receiving and recording electronic communications from customers. Such customer communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as a voice call, a video call, or both, is preferably included. It is contemplated that these communications may be transmitted by and through any type of telecommunication device and over any medium suitable for carrying data. For example, the communications may be transmitted by or through telephone lines, cable, or wireless communications.

As shown in FIG. 9, the VoIP network 900 of the present disclosure is adapted to receive and record varying electronic communications and data formats that represent an interaction that may occur between different callers, e.g., end-users operating the personal communication devices 906, 908, 910, 912, 914 or 916. In the illustrated embodiment, callers may initiate a communication session with agents associated with the VoIP network 900 through a smartphone 908, one or more VoIP phones 906, a computer 910, and/or the like. The initiated communication session, e.g., via the SIP protocol, may be operated by the VoIP provider 902 that converts audio data to VoIP data packets, e.g., RTP packets, etc. For example, the VoIP provider 902 may utilize IP telephony, which integrates audio and video stream control with legacy telephony functions. In some embodiments, the VoIP provider 103 is supported by SIP, and may host a plurality of media servers as shown by the SIP telephony provider 100 shown in FIG. 1. The VoIP provider 902 is further communicatively coupled to the Internet 904 via hardware and software components, e.g., by a gateway or a router 903 that routes the VoIP packets to Internet 904. One of ordinary skill in the art would recognize that the connections between the VoIP provider 903 and external networks such as the Internet 904 as illustrated by FIG. 9 have been simplified for the sake of clarity and the VoIP network 900 may include various additional and/or different software and hardware networking components such as routers, switches, gateways, network bridges, hubs, and legacy telephony equipment.

In some embodiments, the VoIP provider 902, through Internet 904, may process VoIP calls from personal devices 906, 908 and 910 to reach a far end device such as personal devices 912, 914 and 916. For example, a call from an IP telephony client 909, 908 and 910 within the VoIP network 900 to a conventional telephone 914, a fax machine 912, a cellphone 916, or other legacy telephony devices would be routed, through Internet 104, to an IP/PBX-PSTN gateway 907, which in turn translates a VoIP protocol (e.g., SIP) to conventional telephone protocol and route the call to its destination at one of the devices 912, 914 and 916.

The VoIP provider 902 may monitor the call audio quality and route or re-direct VoIP packets to ensure the call audio quality of VoIP calls, as described in FIGS. 1-8.

Figure 10:
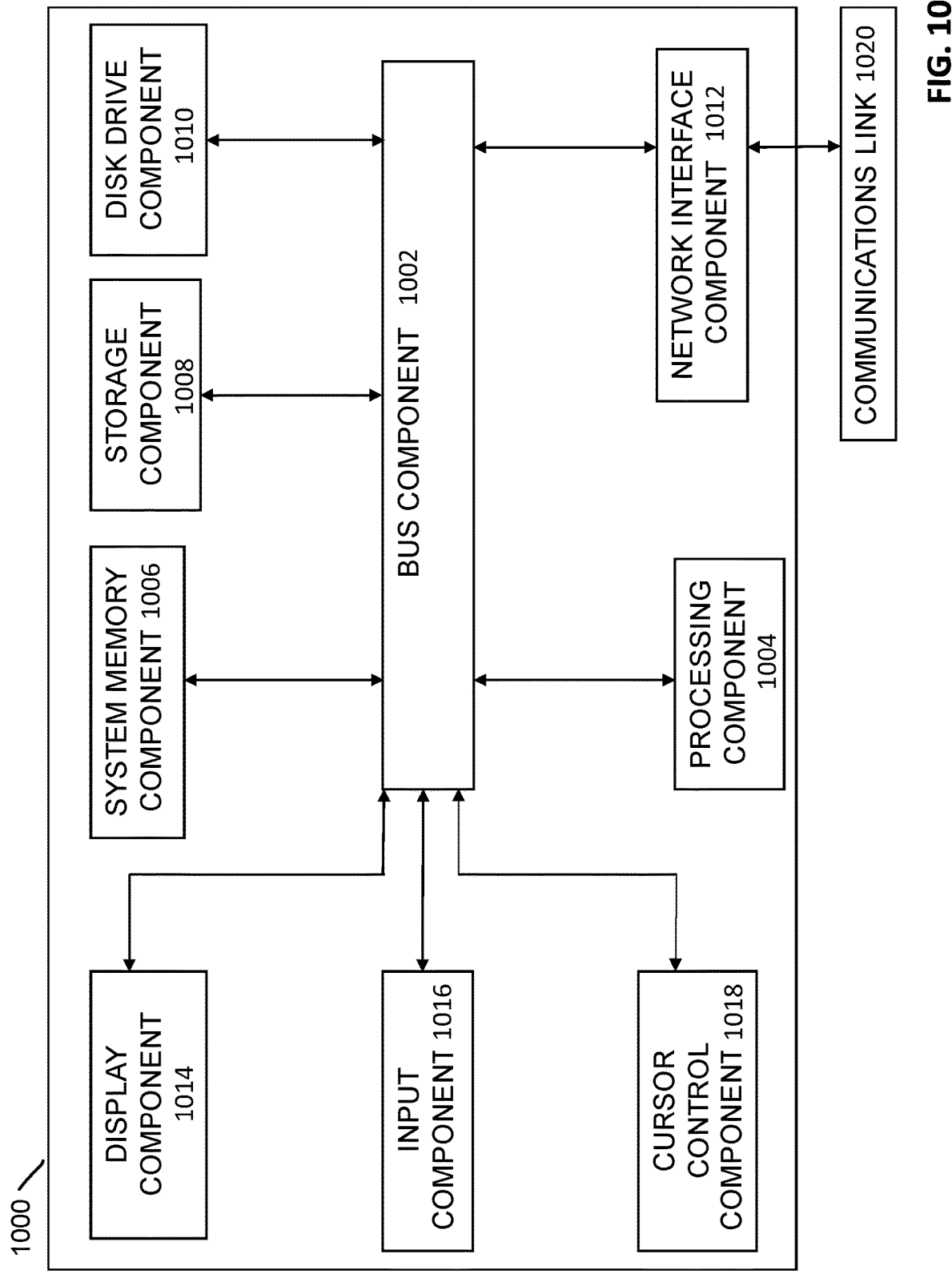
FIG. 10 is a block diagram of a computer system suitable for implementing one or more components in FIGS. 1-8 to perform the process or method shown in FIGS. 1-8, according to one embodiment of the present disclosure.

FIG. 10 is a block diagram of a computer system 1000 suitable for implementing one or more components in FIGS. 1-8 to perform the process or method shown in FIGS. 1-8, according to one embodiment of the present disclosure. For example, the client device 110, the server-side optimal channel recommendation engine 120, may be implemented by the system 1000.

System 1000, such as part a computer and/or a network server, includes a bus 1002 or other communication mechanism for communicating information, which interconnects subsystems and components, including one or more of a processing component 1004 (e.g., processor, micro-controller, digital signal processor (DSP), etc.), a system memory component 1006 (e.g., RAM), a static storage component 1008 (e.g., ROM), a network interface component 1012, a display component 1014 (or alternatively, an interface to an external display), an input component 1016 (e.g., keypad or keyboard), and a cursor control component 1018 (e.g., a mouse pad). The MRC 102, media servers 105a-c (or 205a-c), the VoIP provider 402, and/or other components or modules described in FIGS. 1 and 4 may have similar components as system 1000.

In accordance with embodiments of the present disclosure, system 1000 performs specific operations by processor 1004 executing one or more sequences of one or more instructions contained in system memory component 1006. Such instructions may be read into system memory component 1006 from another computer readable medium, such as static storage component 1008. For example, the storage component 1008 may store instructions to determine an audio quality metric and evaluate whether the audio quality metric is satisfactory. The storage component 1008 further stores instructions to redirect VoIP data packets from a previous endpoint to another endpoint and subsequently modify VoIP parameters when the audio quality metric is unsatisfactory. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 1004 for execution. Such a medium may take many forms, including but not limited to, non-volatile media, volatile media, and transmission media. In various implementations, volatile media includes dynamic memory, such as system memory component 1006, and transmission media includes coaxial cables, copper wire, and fiber optics, including wires that comprise bus 1002. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 1000. In various other embodiments, a plurality of systems 1000 coupled by communication link 1020 (e.g., external network 110 of FIG. 1, LAN, WLAN, PTSN, or various other wired or wireless networks) may perform instruction sequences to practice the disclosure in coordination with one another. Computer system 1000 may transmit and receive messages, data, information and instructions, including one or more programs (i.e., application code) through communication link 1020 and communication interface 1012. For example, the communication link 1020 may be communicatively coupled to and send VoIP packets to the external network 110 of FIG. 1 via communication interface 1012. Received program code may be executed by processor 1004 as received and/or stored in disk drive component 1010 or some other non-volatile storage component for execution.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of ordinary skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system for selecting a communication channel for one or more end users, the system comprising a processor and a non-transitory, computer readable medium operably coupled thereto, the non-transitory, computer readable medium comprising a plurality of instructions stored in association therewith that are accessible to, and executable by, the processor, in conjunction with a network, to perform operations which comprise:
   receiving, from a plurality of user devices, respective communication requests for establishing respective connections between each of the plurality of user devices and a call agent;
   obtaining, via a client application component on each user device, one or more respective channel quality indicators captured by a respective user device for a respective communication link connecting the respective user device and the call agent;
   computing a respective channel quality metric for each respective user device based at least in part on the one or more respective channel quality factors;
   selecting, for each respective user device, a respective communication mode from a list of available communication modes depending on the respective channel quality metric; and
   establishing a shared communication session between the call agent and the plurality of user device according to each selected respective communication mode for the plurality of user devices, respectively.

2. The system of claim 1, wherein the one or more channel quality indicators comprise:
   a network quality indicator,
   a user sentiment indicator,
   an environment noise indicator,
   a location indicator;
   a motion indicator; or
   any combination thereof.

3. The system of claim 1, wherein the network quality indicator includes any combination of a signal strength, a jitter, a packet loss, a latency and a ping signal of the user-selected communication channel.

4. The system of claim 2, wherein the operations of computing the respective channel quality metric further comprise:
   receiving, from a first user device of the plurality of user devices, a plurality of ping signals;
   recording a respective receipt timestamp corresponding to each received ping signal; and
   computing, for a period of time, a ping factor index based on respective receipt timestamps of ping signals received within the period of time.

5. The system of claim 4, further comprising determining a first channel recommendation by:
   determining a combined audio and video channel as the first channel recommendation when the computed ping factor is no greater than a first threshold;
   determining an audio-only channel as the first channel recommendation when the computed ping factor is greater than the first threshold but no greater than a second threshold that is greater than the first threshold; and determining live transcript delivery when the computed ping factor is greater than the second threshold.

6. The system of claim 2, wherein the motion indicator includes any combination of a velocity of movement of the first user device and a direction of movement of the first user device.

7. The system of claim 2, wherein the location indicator includes a set of Global Positioning System (GPS) coordinates of the first user device.

8. The system of claim 2, wherein the user sentiment indicator includes a microphone reading clip captured by the first user device, and wherein the operations of computing the channel quality metric further comprise:
   extracting one or more keywords relating to user sentiment from the microphone reading clip; and
   determining a user sentiment score indicating a communication quality of a live conversation based on the extracted one or more keywords.

9. The system of claim 1, wherein the operations of computing the respective channel quality metric further comprise:
   computing an ambient noise level score based on the environment noise indicator;
   computing a user movement score based on the movement indicator;
   computing a weighted sum of the ambient noise level score and the user movement score;
   determining a voice channel as a first channel recommendation when the weighted sum is below a first threshold and a voice network strength is above a second threshold; and
   determining a data channel as a second channel recommendation when the weighed sum is greater than the first threshold and a data network strength is above a third threshold.

10. The system of claim 1, wherein the selecting, for each respective user device, the respective communication mode from the list of available communication modes depending on the respective channel quality metric comprises:
   selecting a video communication mode when the respective channel quality metric indicates superior channel quality; and
   selecting a audio-only communication mode when the respective channel quality metric indicates inferior channel quality.

11. A method for selecting a communication channel for one or more end users, the method comprising:
   receiving, from a plurality of user devices, respective communication requests for establishing respective connections between each of the plurality of user devices and a call agent;
   obtaining, via a client application component on each user device, one or more respective channel quality indicators captured by a respective user device for a respective communication link connecting the respective user device and the call agent;
   computing a respective channel quality metric for each respective user device based at least in part on the one or more respective channel quality factors;
   selecting, for each respective user device, a respective communication mode from a list of available communication modes depending on the respective channel quality metric; and
   establishing a shared communication session between the call agent and the plurality of user device according to each selected respective communication mode for the plurality of user devices, respectively.

12. The method of claim 11, wherein the one or more channel quality indicators comprise:
   a network quality indicator,
   a user sentiment indicator,
   an environment noise indicator,
   a location indicator;
   a motion indicator; or
   any combination thereof.

13. The method of claim 11, wherein the network quality indicator includes any combination of a signal strength, a jitter, a packet loss, a latency and a ping signal of the user-selected communication channel.

14. The method of claim 12, wherein computing the respective channel quality metric further comprises:
   receiving, from a first user device of the plurality of user devices, a plurality of ping signals;
   recording a respective receipt timestamp corresponding to each received ping signal; and
   computing, for a period of time, a ping factor index based on respective receipt timestamps of ping signals received within the period of time.

15. The method of claim 14, further comprising:
   selecting a combined audio and video communication mode when the computed ping factor is no greater than a first threshold;
   selecting an audio-only communication mode when the computed ping factor is greater than the first threshold but no greater than a second threshold that is greater than the first threshold; and
   selecting live transcript delivery when the computed ping factor is greater than the second threshold.

16. The method of claim 12, wherein the motion indicator includes any combination of a velocity of movement of the first user device and a direction of movement of the first user device.

17. The method of claim 12, wherein the location indicator includes a set of Global Positioning System (GPS) coordinates of the first user device.

18. The method of claim 12, wherein the user sentiment indicator includes a microphone reading clip captured by the first user device, and wherein the operations of computing the channel quality metric further comprise:
   extracting one or more keywords relating to user sentiment from the microphone reading clip; and
   determining a user sentiment score indicating a communication quality of a live conversation based on the extracted one or more keywords.

19. The method of claim 11, wherein computing the respective channel quality metric further comprises:
   computing an ambient noise level score based on the environment noise indicator;
   computing a user movement score based on the movement indicator;
   computing a weighted sum of the ambient noise level score and the user movement score;
   determining a voice channel as a first channel recommendation when the weighted sum is below a first threshold and a voice network strength is above a second threshold; and
   determining a data channel as a second channel recommendation when the weighed sum is greater than the first threshold and a data network strength is above a third threshold.

20. A processor-readable non-transitory storage medium storing processor-executable instructions for selecting a communication channel for one or more end users, the instructions being executed by a processor to perform operations comprising:
- receiving, from a plurality of user devices, respective communication requests for establishing respective connections between each of the plurality of user devices and a call agent;
- obtaining, via a client application component on each user device, one or more respective channel quality indicators captured by a respective user device for a respective communication link connecting the respective user device and the call agent;
- computing a respective channel quality metric for each respective user device based at least in part on the one or more respective channel quality factors;
- selecting, for each respective user device, a respective communication mode from a list of available communication modes depending on the respective channel quality metric; and
- establishing a shared communication session between the call agent and the plurality of user device according to each selected respective communication mode for the plurality of user devices, respectively.

* * * * *